US009480914B2

(12) United States Patent
Kruglick (10) Patent No.: US 9,480,914 B2
(45) Date of Patent: Nov. 1, 2016

(54) ONLINE GAMING (71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/736,365

(22) Filed: Jun. 11, 2015

(65) Prior Publication Data
US 2015/0273328 A1 Oct. 1, 2015

Related U.S. Application Data (63) Continuation of application No. 13/519,393, filed as application No. PCT/US2012/024127 on Feb. 7, 2012, now Pat. No. 9,095,772.

(51) Int. Cl.
*A63F 13/35* (2014.01)
*A63F 9/24* (2006.01)
(Continued)

(52) U.S. Cl.
CPC .............. *A63F 13/35* (2014.09); *A63F 9/24* (2013.01); *A63F 13/355* (2014.09); *G06F 9/00* (2013.01);
(Continued)

(58) Field of Classification Search
CPC .............. A63F 2300/63; A63F 2300/632; A63F 2300/5533; A63F 2300/50; A63F 2300/51; A63F 2300/40; A63F 2300/66; A63F 2300/6615; A63F 2300/538; A63F 2300/6661; A63F 13/35; A63F 13/355; A63F 9/24; A63F 2300/5593; G06F 9/00; G06T 15/20; G06T 2219/024; G06T 19/00
See application file for complete search history.

(56) References Cited

U.S. PATENT DOCUMENTS 5,742,289 A 4/1998 Naylor et al.
6,570,563 B1 5/2003 Honda
(Continued)

FOREIGN PATENT DOCUMENTS

GB 2347332 A 8/2000
JP 8-161526 A 6/1996
(Continued)

OTHER PUBLICATIONS

Alvarez, A., "Rendering in passes and layers," accessed at https://web.archive.org/web/20120114135241/http://www.thegnomonworkshop.com/tutorials/passes_layers/passes_layers.html, accessed on Jun. 1, 2015, pp. 4.
(Continued)

*Primary Examiner* — David L Lewis
*Assistant Examiner* — Matthew D. Hoel
(74) *Attorney, Agent, or Firm* — Brundidge & Stanger, P.C.

(57) ABSTRACT

Technologies and implementations for providing and online gaming experience are generally disclosed. In one example, a computer-implemented method to allocate rendering tasks to resources of a server system comprise determining at least a portion of a first game world view viewable at a first game client of a plurality of game clients, receiving at least a portion of a game input from the first game client, determining a change from the first game world state to a second game world state, determining based on the second game world state, by the server system, a second game world view, determining a first render task to update the first game element and a second render task to update the second game element and allocating, the first render task to a first game element resource and the second render task to a second game element resource.

15 Claims, 5 Drawing Sheets (51) Int. Cl.
G06F 9/00 (2006.01)
A63F 13/355 (2014.01)
G06T 15/20 (2011.01)
G06T 19/00 (2011.01)

(52) U.S. Cl.
CPC .............. *G06T 15/20* (2013.01); *G06T 19/00* (2013.01); *A63F 2300/5593* (2013.01); *G06T 2219/024* (2013.01)

(56) References Cited

U.S. PATENT DOCUMENTS

| | | |
|---|---|---|
| 8,572,280 B2 | 10/2013 | Dussault |
| 8,698,813 B2 | 4/2014 | Iwasaki |
| 2006/0088220 A1 | 4/2006 | Cheung et al. |
| 2008/0098064 A1 | 4/2008 | Sherinian |
| 2009/0215540 A1 | 8/2009 | Perlman et al. |
| 2009/0238405 A1 | 9/2009 | Buznach |
| 2010/0060640 A1 | 3/2010 | Melikian et al. |
| 2010/0241692 A1 | 9/2010 | Klee et al. |
| 2011/0304634 A1 | 12/2011 | Urbach |

FOREIGN PATENT DOCUMENTS

| | | | |
|---|---|---|---|
| JP | 9-81782 | A | 3/1997 |
| JP | 2007-500395 | A | 1/2007 |
| JP | 2008-531072 | A | 8/2008 |
| JP | 2008-264339 | A | 11/2008 |

OTHER PUBLICATIONS

Decarlo, M., "Internet processed 9.57 zellabytes of information in 2008," accessed at http://web.archive.org/web/20110829180233/http://www.techspot.com/news/43187-internet-processed-957-zettabytes-of-information-in-2008.html, Apr. 7, 2011, pp. 7.

Graham, R., "Business information consumption: 9,570,000,000,000,000,000,000 bytes per year," accessed at https://web.archive.org/web/20110412101319/http://ucsdnews.ucsd.edu/newsrel/general/04-05BusinessInformation.asp, Apr. 6, 2011, pp. 4.

Hsu, C-C., et al., "On the design of multiplayer online video game systems," Proceedings of the SPIE, vol. 5241, pp. 180-191 (Nov. 19, 2003).

International Search Report and Written Opinion for International Patent Application No. PCT/US12/24127 mailed May 25, 2012.

Ma, K-L., et al., "Parallel vol. rendering using binary-swap compositing," IEEE Computer Graphics and Applications, vol. 14, Issue 4, pp. 59-68 (Jul. 1994).

Molnar, S., et al., "A sorting classification of parallel rendering," IEEE Computer Graphics and Applications, vol. 14, Issue 4, pp. 23-32 (Jul. 1994).

Neumann, U., "Volume reconstruction and parallel rendering algorithms: a comparative analysis," Ph.D thesis, University of North Carolina at Chapel Hill (1993).

Samanta, R., et al., "Parallel rendering with k-way replication," Proceedings of the IEEE 2001 symposium on parallel and large-data visualization and graphics, pp. 75-84 (Oct. 23, 2001).

Stegmaier, S., et al., "A generic solution for hardware-accelerated remote visualization," Joing EUROGRAPHICS-IEEE TCVG Symposium on Visualization, pp. 9 (2002).

400 A computer program product

402 A signal bearing medium

404 Machine-readable instructions that, when executed, cause a server system to provide an online gaming experience to game clients by:

allocating each of a plurality of game elements to a corresponding plurality of game element resources;
  determining whether a render task is required based at least in part on an update to a game world state, the game world state defining a game world for a plurality of game clients;
  if the render task is required:
    determining a first viewport of a game world view for a first game client of the plurality of game clients;
    determining, for the first viewport, whether a first game element of the plurality of game elements is viewable from the first viewport;
    if the first game element of the plurality of game elements is viewable from the first viewport: generating, at a first game element resource corresponding to the first game element, a rendering of the first game element for the first viewport, and transmitting the rendering of the first game element to the first game client;

determining a second viewport of the game world view for a second game client of the plurality of game clients;
    determining, for the second viewport, whether the first game element of the plurality of game elements is viewable from the second viewport;
    if the first game element of the plurality of game elements is viewable from the second viewport, generating, at the first game element resource corresponding to the first game element, a game client-dependent rendering of the first game element for the second viewport based at least in part on a gameclient-independent rendering and the second viewport;

determining, for the first viewport, whether a second game element of the plurality of game elements is viewable from the first viewport;
    if the second game element of the plurality of game elements is viewable from the first viewport: generating, at a second game element resource corresponding to the second game element, a rendering of the second game element for the first viewport, and transmitting the rendering of the second game element to the first game client;

allocating each of a plurality of action resolutions to a corresponding plurality of action resolution resources at the server system;
  determining a first action resolution for the game input at a first action resolution resource of the plurality of action resolution resources; or
  applying the action resolution to the game world state.

| 406 a computer-readable medium | 408 a recordable medium | 410 a communications medium |

ONLINE GAMING

CROSS-REFERENCE TO RELATED APPLICATIONS

This Application is a continuation under 35 U.S.C. §120 of U.S. patent application Ser. No. 13/519,393, filed on Jun. 27, 2012, now U.S. Pat. No. 9,095,772, which is the U.S. National Stage filing under 35 U.S.C. §371 of PCT Application No. PCT/US2012/024127, filed on Feb. 7, 2012. The disclosures of the U.S. patent application and the PCT Application are hereby incorporated herein by reference herein in their entireties.

BACKGROUND

Unless otherwise indicated herein, the approaches described in this section are not prior art to the claims in this application and are not admitted to be prior art by inclusion in this section.

Current multiplayer online games may have the client side performing character and scene rendering and may have the server side performing game world interactions. As online games shift toward having the server side perform rendering, current processing techniques may require multifold full distribution of scenery and characters within the server. Such techniques may create a level of intra-system data traffic that may be a prohibitive factor in enhancing the online gaming experience.

SUMMARY

In some embodiments, the present disclosure describes examples methods for providing an online gaming experience to game clients. Example methods may include allocating each of a plurality of game elements to a corresponding plurality of game element resources at a server system, determining a render task may be required based on an update to a game world state that defines a game world for a plurality of game clients, determining a first viewport of a game world view for a first game client of the plurality of game clients, determining whether a first game element of the plurality of game elements is viewable from the first viewport and, if the first game element of the plurality of game elements is viewable from the first viewport, generating, at a first game element resource corresponding to the first game element, a rendering of the first game element for the first viewport and transmitting the rendering of the first game element to the first game client.

In some embodiments, the present disclosure also describes example machine readable non-transitory medium having stored therein instructions that, when executed, cause a server system to provide an online gaming experience to game clients. Example machine readable non-transitory media may have stored therein instructions that, when executed, cause a server system to provide an online gaming experience to game clients by allocating each of a plurality of game elements to a corresponding plurality of game element resources at a server system, determining a render task may be required based on an update to a game world state that defines a game world for a plurality of game clients, determining a first viewport of a game world view for a first game client of the plurality of game clients, determining whether a first game element of the plurality of game elements is viewable from the first viewport and, if the first game element of the plurality of game elements is viewable from the first viewport, generating, at a first game element resource corresponding to the first game element, a rendering of the first game element for the first viewport and transmitting the rendering of the first game element to the first game client.

In some embodiments, the present disclosure also describes example systems. Example systems may include a processor and a machine readable medium having stored therein instructions that, when executed, cause a server system to provide an online gaming experience to game clients by allocating each of a plurality of game elements to a corresponding plurality of game element resources at a server system, determining a render task may be required based on an update to a game world state that defines a game world for a plurality of game clients, determining a first viewport of a game world view for a first game client of the plurality of game clients, determining whether a first game element of the plurality of game elements is viewable from the first viewport and, if the first game element of the plurality of game elements is viewable from the first viewport, generating, at a first game element resource corresponding to the first game element, a rendering of the first game element for the first viewport and transmitting the rendering of the first game element to the first game client.

The foregoing summary may be illustrative only and may not be intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 4 is an illustration of an example computer program product; and

DETAILED DESCRIPTION

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, systems and computer readable media related to providing an online gaming experience to game clients.

In some examples, an object oriented game server system may be provided for providing an online gaming experience. In some examples, the online game may be a massively multiplayer online game. In some examples, the architecture may provide for game elements to each be allocated to a resource or service at the server system. In such an architecture, a model for a game element may stay substantially localized at the resource or service, which may provide for model data to rarely be moved around the server system such that server system resources may be efficiently utilized. In some examples, the game server may be service oriented such that game actions may be resolved at allocated resources or services such that similar server system resource savings may be achieved.

In response to a determination that a render task may be required, game inputs, game viewport information, and/or other information may be served to multiple resources at the server, either in whole or in part. As discussed, server resources may be allocated and/or dedicated to action resolution or game elements, for example. In some examples, one or more action resolution resources may resolve game action related to the received game input(s) and update a game world state, which may be maintained at the server system. In response to the game world state update, the allocated game element resources may render game elements to be transmitted to the game clients. In some examples, the game elements being rendered at allocated game element resources may provide an efficient parallel game server architecture.

In some examples, viewports for the game clients may be evaluated to determine one or more game elements that may be viewable from the viewports. In general, a viewport may include a viewing region of a game world and the viewport may include any suitable shape. In some examples, a viewport may define a 2-dimensional projection of a 3-dimensional scene. In some examples, a viewport may include a viewable area for a game client. As will be appreciated, some game elements may be included in multiple game client viewports. In some examples, the game elements may be rendered such that a game client-independent rendering may be used commonly across the multiple viewports with the final game client-dependent rendering being performed for each viewport based on the game client-independent rendering. Such techniques and architecture may substantially reduce wasteful repetitive game element renderings. The system architectures and methods discussed herein may provide for massively multiplayer online game having cinematic quality game elements.

Figure 1:
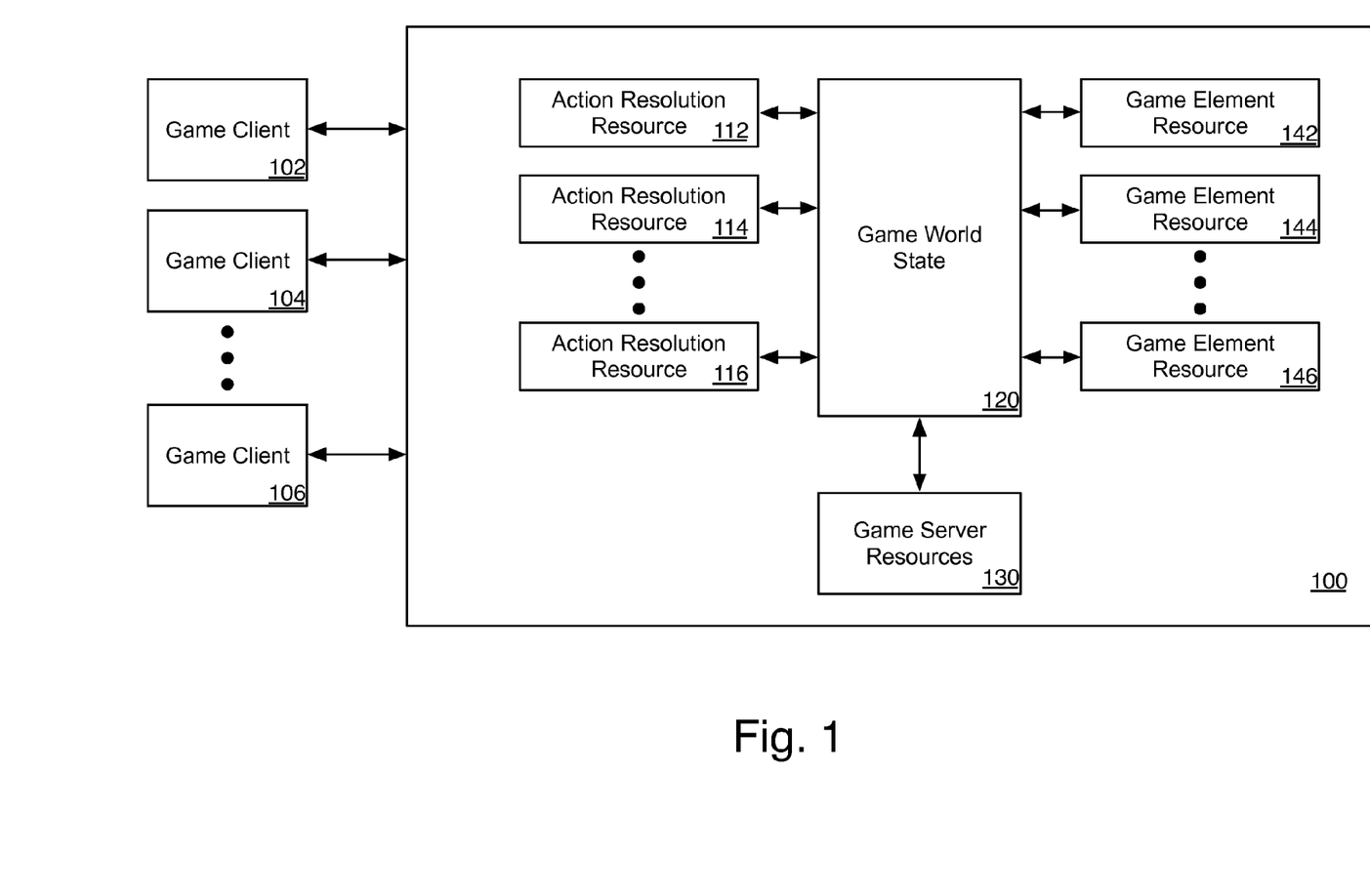
FIG. 1 is an illustration of a block diagram of an example system for providing an online gaming experience.

FIG. 1 is an illustration of a block diagram of an example system 100 for providing an online gaming experience, arranged in accordance with at least some embodiments of the present disclosure. As shown, system 100 may include a game world state 120, game server resources 130, action resolution resources 112, 114, 116, and game element resources 142, 144, 146. Also as shown, system 100 may be in communication with one or more game clients 102, 140, 106. In general, system 100 may be implemented in any suitable manner discussed herein, in particular as discussed with FIG. 4 below. System 100 may implement the techniques discussed herein to provide an online gaming experience to game clients 102, 104, 106.

In general, in a game or game environment, game elements may each be allocated to corresponding game element resources at system 100. The allocated game elements may include any suitable game elements. In some examples, the game elements may be individually rendered using allocated game element resources 142, 144, 146 at system 100, as is discussed further herein. In some examples, an allocated game element may be a game character, a portion of a game character, a game object, a portion of a game object, a portion of a game scene, or a game scene, or the like. As shown, game elements may be allocated to respective game element resources 142, 144, 146. In general, game element resources 142, 144, 146 may include any suitable computing elements. In some examples, game element resources 142, 144, 146 may include a computer, a multiple number of computers, a server, a computing resource, a virtual machine, or a computing cluster, or the like. As will be appreciated, some game elements may not be allocated to dedicated game element resources. In some examples, such game elements may be rendered either at the game client or at game server resources 130.

As shown, in some examples, game action resolutions may each be allocated to action resolution resources 112, 114, 116. In general, the allocated game action resolutions may include any suitable game action resolutions. In some examples, the game action resolutions may be individually processed using action resolution resources 112, 114, 116 at system 100, as is discussed further herein. In some examples, the allocated game action resolutions may include a combat resolution resource, a motion resolution resource, an object resolution resource, or a collision resolution resource, or the like. As shown, game action resolutions may be assigned to respective action resolution resources 112, 114, 116. In general, action resolution resources 112, 114, 116 may include any suitable computing elements. In some examples, action resolution resources 112, 114, 116 may include a computer, a multiple number of computers, a server, a computing resource, a virtual machine, or a computing cluster, or the like. As will be appreciated, some game action resolution may not be allocated to dedicated resolution action resources. In some examples, action resolutions may be rendered either at the game client or at game server resources 130.

As shown, in some examples, system 100 may include game world state 120. In general, game world state 120 may include the state of the online game being provided. In some examples, the game world state may be maintained and updated at the game server. In some examples, game world state 120 may define a game world for game clients 102, 104, 106. In some examples, the game world state may include game element locations, game element poses, or game lighting, or the like. Game world state 120 may be implemented in any suitable manner at system 100. In some examples, game world state 120 may be implemented as a database. As shown, action resolution resources 112, 114, 116, game element resources 142, 144, 146, and game server resources 130 may be communicatively coupled to game world state 120.

As shown, game clients 102, 104, 106 may be communicatively coupled to system 100. As is discussed further herein, game clients 102, 104, 106 may provide or transmit game inputs, viewport information, and/or other information to system 100. In general, the game inputs may include any suitable game inputs. In some examples, the game inputs may include a game element motion, a game element selection, a game resource selection, a game choice selection, a game move, or the like. In general, the viewport information may include any suitable information. In some examples, the viewport information may include a location within the game world, a view within the game world, coordinates of the game world, or the like. The game input, viewport, and other information may be communicated to server 100 using any suitable communication technique. In some examples, the game input may be communicated via an online communication with server 100.

In general, at server 100, the game input, viewport information, and/or other information may be communicated to any suitable resource or resources. In some examples, the game input may be communicated to game server resources 130. In some examples, the game input may include a game action and all or a portion of the game input may be communicated to one or more of action resolution resources 112, 114, 116. In some examples, the game input may include a modification to a game element and all or a portion of the game input may be communicated to one or more of game element resources 142, 144, 146. In some examples, the viewport information may be transmitted to one or more of game element resources 142, 144, 146. In some examples, the game input may be provided in whole to the necessary resources. In some examples, the game input may be provided in part to the necessary resources such that game input data or signals may be sent containing only the information required by the resource. Such techniques may reduce data transfer within system 100.

As discussed, in some examples, the game input, viewport information, and/or other information may be communicated with one or more of action resolution resources 112, 114, 116. In general, the one or more action resolution resources 112, 114, 116 may process a game action related to the game input and game world state 120 may be updated in response to the processed game action. As discussed, action resolution resources 112, 114, 116 may individually process game actions allocated to the resource. In some examples, action resolution resources 112, 114, 116 may communicate with one another as needed. As will be appreciated, the updated game world state may result in changes or updates to a game world view where the game world view may be a visual depiction or representation of the game world state. The updated game world view may thereby require updated renderings of one or more game elements. Such updated renderings may be performed at game element resources 142, 144, 146 in response to updated game world state 120 and the corresponding update to the game world view.

As is discussed further herein, in some examples, game elements affected by the update to the game world state may require an updated rendering. A game element may require an updated rendering, for example, if one or more of game clients 102, 104, 106 may have a view of the game element or a portion of the game element from the game client's viewport where the viewport may be the region of the entire game world view viewable by the game client. In such examples, the game element that may require an updated rendering may be rendered at the allocated game element resource. Such a rendering may include a game client-independent rendering and a subsequent game client-dependent rendering. In some examples, the game client-independent rendering may include one or more rendering passes that may not depend on the view of the game element. In some examples, the game client-dependent rendering may include one or more rendering passes that may depend on the view of the game element and the game client-dependent rendering may be made based on the game client-independent rendering.

In some examples, the game element may be viewed by more than one of game clients 102, 104, 106. In such examples, the game client-independent rendering of the game element may be made only once at the game element resource. In some examples, each game client-dependent rendering of the game element may be made based on the same game client-independent rendering. Such techniques may have the advantage of saving substantial processing resources at system 100. As discussed, game element resources 142, 144, 146 may individually process renderings for the related allocated game element. In some examples, game element resources 142, 144, 146 may communicate with one another as needed.

Such rendering and/or processing techniques may be performed at system 100 as needed to render all the necessary game elements for the viewports of game clients 102, 104, 106. In general, the rendered game elements may be transmitted to game clients 102, 104, 106 in any suitable manner. In some examples, each rendered game element may be transmitted separately. In some examples, the game-client specific portion of each element may be transmitted separately to game clients 102, 104, 106. In some examples, a rendered scene including one or more rendered game elements may be transmitted as a composited scene. In some examples, multiple rendered game elements may be transmitted to a game client along with meta data related to recomposing the rendered game elements. In some examples, the meta data may include a tracking viewing condition, a line of sight computation, or a boundary box tracking, or the like.

As discussed, the techniques described herein may be used to provide an online gaming experience to game clients 102, 104, 106. In general, the described techniques may provide the gaming experience to any number of game clients. Further, system 100 may include any number of game element resources 142, 144, 146 and action resolution resources 112, 114, 116. The described systems and techniques may provide parallelization such that the amount of data transferred within system 100 may be reduced. In some examples, the game elements discussed herein may be rendered in cinema quality. Such quality may provide for game characters, for example, that may occupy about 1 GB of memory, or more. The described system and techniques may provide for efficient game element renderings with game client-independent rendering reuse and intelligent rendering decision making to eliminate unneeded renderings. The discussed techniques are described in further detail herein, in particular with respect to FIG. 2.

Figure 2:
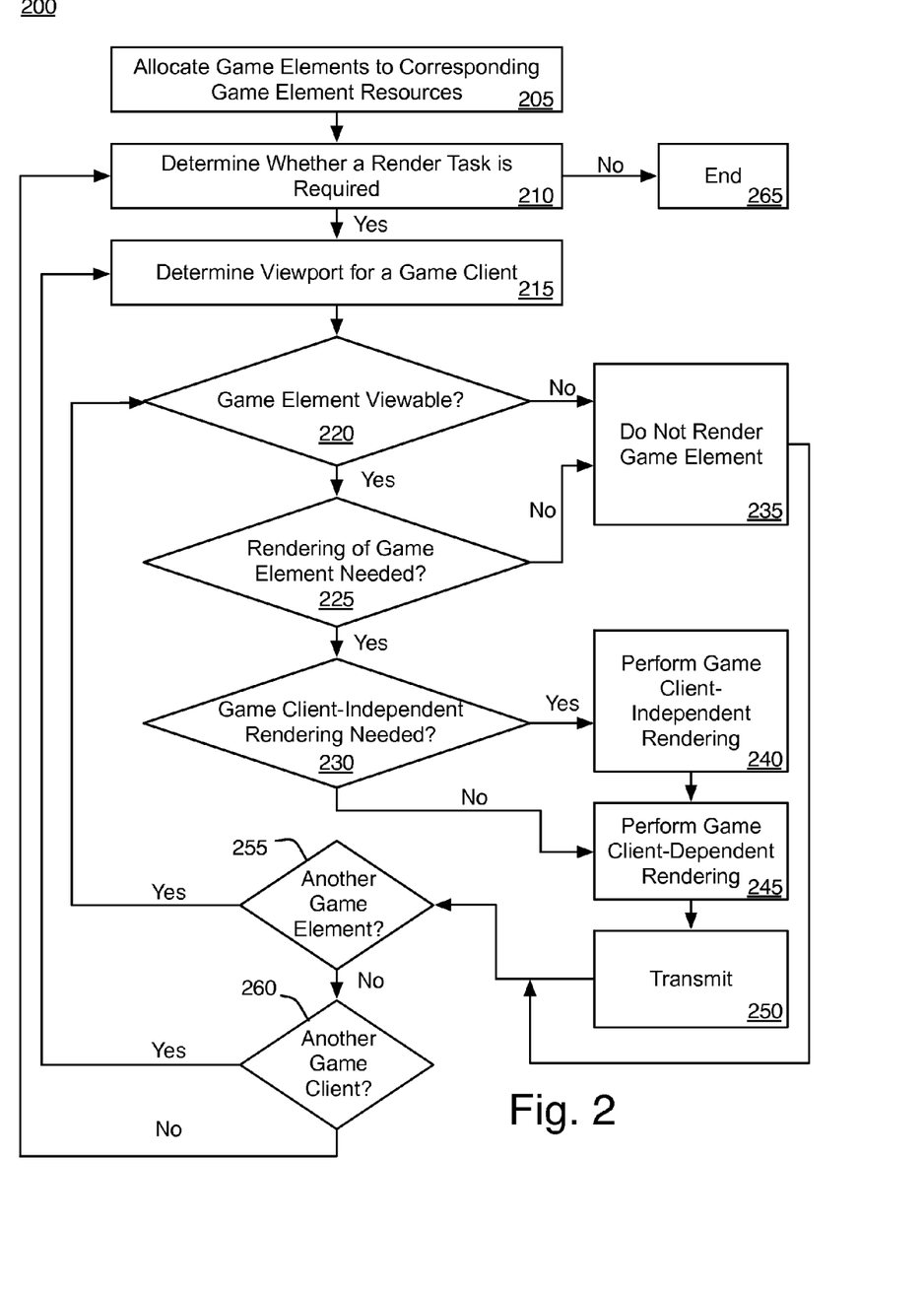
FIG. 2 is an illustration of a flow diagram of an example method for providing an online gaming experience.

FIG. 2 is an illustration of a flow diagram of an example method 200 for providing an online gaming experience, arranged in accordance with at least some embodiments of the present disclosure. In general, method 200 may be performed by any suitable device, devices, or system such as those discussed herein. In some examples, method 200 may be performed by a server system. In some examples, method 200 may be performed by a data center or a data center cluster. Method 200 sets forth various functional blocks or actions that may be described as processing steps, functional operations, events and/or acts, etc., which may be performed by hardware, software, and/or firmware. Numerous alternatives to the functional blocks shown in FIG. 2 may be practiced in various implementations. For example, intervening actions not shown in FIG. 2 and/or additional actions not shown in FIG. 2 may be employed and/or some of the actions shown in FIG. 2 may be eliminated, without departing from the scope of claimed subject matter. In some examples, the actions shown in FIG. 2 may be operated using parallel processing techniques. Method 200 may include one or more of functional operations as indicated by one or more of blocks 205, 210, 215, 220, 225, 220, 235, 240, 245, 250, 255, and/or 260. The process of method 200 may begin at block 205.

At block 205, "Allocate Game Elements to Corresponding Game Element Resources", each of a multiple number of game elements may be allocated to a corresponding multiple number of game element resources at a server system. In general, the server system may be implemented in any manner as discussed herein. As discussed, the allocated game elements may include any suitable game elements. In some examples, the allocated game element may be a game character, a portion of a game character, a game object, a portion of a game object, a portion of a game scene, or a game scene, or the like. Game elements may be assigned to respective game element resources, such as game element resources 142, 144, 146. In general, the game element resources may include any suitable computing elements such as, for example, a computer, a plurality of computers, a server, a computing resource, a virtual machine, or a computing cluster, or the like. As will be appreciated, some game elements may not be allocated to dedicated game element resources. The process of method 200 may continue at block 210.

At block 210, "Determine whether a Render Task is Required", the server system may determine a render task may be required. If it is determined that no render task is required, the process of method 200 may end at block 265. In general, the server system may determine a render task is required in any suitable manner. In some examples, the server system may determine a render task is required based on an update to the game world state. In some examples, the server system may determine a render task may be required based on an update to the game world state based on a game change. Such a game change may be based on a game rule, a game algorithm, or game physics from the game being applied to the game world state. In some examples, the server system may determine a render task is required based on a passage of time, such as time tick or time period passage, or the like.

In some examples, the server system may determine a render task the server system may determine a render task is required based on a game change to the game world state based on a game input received from a game client. In general, the server system may receive input from game clients in any suitable manner. In general, any number of game clients may be communicatively coupled to the server system and any game client may transmit a game input to the server system. In general, the game input may be any suitable game input such as, for example, a requested character motion, a requested character action, a game view change, or a game transaction, or the like. In some examples, a multiple number of game inputs may be collected from one or more game clients.

As discussed herein, in some examples, a game input or a multiple number of game inputs may be received. In some examples, the game input or inputs may be used to update the game world state. In general, the game world state may be maintained and updated at the game server. In some examples, the game world state may include game element locations, game element poses, or game lighting, or the like. The game world state may be updated using any suitable technique or techniques. In some examples, the game world state may be maintained as a database and the game world update may include a database update. In some examples, updating the game world state may include determining an action resolution for the game input and applying the action resolution to the game world state. In some examples, updating the game world state may include resolving the actions of objects or events being managed by action resolution resources or the game server. In some examples, each of a multiple number of game action resolutions may be allocated to a corresponding multiple number of action resolution resources at the server system. In such examples, an action resolution may be determined at an action resolution resource of the multiple number of action resolution resources related to the received game input. In general, the game action resolutions may include any suitable game action resolution. In some examples, the action resolution resource may be a combat resolution resource, a motion resolution resource, an object resolution resource, or a collision resolution resource. The process of method 200 may continue at block 215.

At block 215, "Determine Viewport for a Game Client", a viewport of a game world view for a game client may be determined. In general, the viewport may be determined using any suitable technique. In some examples, the viewport of the game world view may be determined by receiving a viewport parameter from the game client. In some examples, the viewport of the game world view may be determined by generating a viewport parameter at the server system. In some examples, the game world view may be a visual depiction or representation of the game world state. In some examples, the viewport may be the region of the entire game world view viewable by the game client. As discussed, the viewport may be related to a game client. In some examples, the viewport may be a first viewport related to a first game client. The process of method 200 may continue at block 220.

At decision block 220, "Game Element Viewable?", it may be determined whether a game element of the multiple number of game elements is viewable from the viewport. In general, it may be determined whether the game element may be viewable from the viewport using any suitable technique or techniques. In some examples, it may be determined whether the game element may be viewable from the viewport by determining whether one or more polygons of the game element may be viewable within the viewport and not obscured by any other game elements. If the game element is not viewable from the viewport, the process of method 200 may continue at block 235. If the game element is viewable from the viewport, the process of method 200 may continue at block 225.

At block 235, "Do Not Render Game Element", the game element is not be rendered. As will be appreciated, in general, if a game element may not be viewable from a game client's viewport, rendering the game element as seen from that viewport may be wasteful of server resources. If the game element may not be rendered, the process of method 200 may continue at block 255, as is discussed further herein below.

At decision block 225, "Rendering of Game Element Needed?", it may be determined whether a game element needs to be rendered. In general, it may be determined whether a game element needs to be rendered using any suitable technique or techniques. In some examples, a game element may not need to be rendered because although the game element may be viewable, it may be at a range (e.g., it may be small in the viewport) in the view such that the element may not need to be rendered. In some examples, a game element may not need to be rendered because the desired rendering has been previously completed and saved in memory (e.g., cached) at the server system. If the game element may not need to be rendered, the process of method 200 may continue at block 235. If the game element needs to be rendered, the process of method 200 may continue at block 230.

As discussed, at block 235, "Do Not Render Game Element", the game element is not rendered and the process of method 200 may continue at block 255, as is discussed further herein below.

At decision block 230, "Game Client-Independent Rendering Needed?", it may be determined whether a game client-independent rendering of a game element is needed. In general, a game client-independent rendering of the game element may be required if a game client-independent rendering has not been completed and saved at the server system. As is described herein, the process of method 200 may be completed for any number of game clients and/or game client viewports and a game element may be viewable and require rendering for one or more game client viewports. In general, for a first rendering of the game element, a game client-independent rendering of the game element or a portion of the game element may be required. In some examples, that rendering may be saved at the server system and for subsequent renderings of the game element (for other game client viewports) the game client-independent rendering may not be repeated and, instead, the saved game client-independent rendering may be used. Such techniques may save substantial processing resources at the server system. If the game client-independent rendering does not need to be rendered, the process of method 200 may continue at block 245. If the game client-independent rendering needs to be rendered, the process of method 200 may continue at block 240.

At block 240, "Perform Game Client-Independent Rendering", a game client-independent rendering of a game element may be performed. In general, the game client-independent rendering may be completed at a server resource allocated to the game element, as discussed herein and in particular with respect to FIG. 1. In general, the game client-independent rendering may be performed on the entire game element or on one or more active polygons of the game element such that active polygons may include those polygons of the game element rendering that require an updated rendering. In some examples, the active polygons may include polygons that may be viewable from the game client viewport. In some examples, polygons that may not require an updated rendering may be considered inactive and may not be rendered. In general, the game client-independent rendering may be performed using any suitable technique or techniques. In some examples, a game client-independent rendering of the one or more active polygons of the game element may be performed. In some examples, the a game client-independent rendering may include multiple of rendering passes. As discussed, in some examples, the game client-independent rendering of the entire game element or the one or more active polygons of the game element may be cached for future use at the server system.

As discussed, the game client-independent rendering may include one or more rendering passes. In general, the rendering passes may include any suitable rendering technique or techniques. In some examples, the rendering passes may include a normal rendering, a diffuse rendering, a specular rendering, a color rendering, a shadow rendering, an ambient occlusion (AO) rendering, a geometry rendering, a displacement rendering, a wireframe rendering, an altitude rendering, a Z-depth rendering, or an alpha rendering, or the like. In general, one or more of the rendering passes may be performed. As will be appreciated, more rendering passes may improve the game element rendering but may require more server system resources. In some examples, the server system may determine whether to perform a type of rendering pass based on one or more factors such as a server resource load, a location or prominence of the game element, a number of uses of the game client-independent rendering, or a game element importance, or the like. The process of method 200 may continue at block 245.

At block 245, "Perform Viewport Dependent Rendering", a game client-dependent rendering of the entire game element or of the one or more active polygons of the game element may be performed. In general, the game client-dependent rendering may be completed at a server resource allocated to the game element, as discussed herein and in particular with respect to FIG. 1. In general, the game client-dependent rendering may be based on the game client-independent rendering and the game client viewport. In general, the game client-dependent rendering may be performed using any suitable technique or techniques. In some examples, the game client-dependent rendering may include one or more rendering passes. In general, the rendering passes may include any suitable rendering technique or techniques. In some examples, the rendering passes may include a normal rendering, a diffuse rendering, a specular rendering, a color rendering, a shadow rendering, an ambient occlusion (AO) rendering, a geometry rendering, a displacement rendering, a wireframe rendering, an altitude rendering, a Z-depth rendering, or an alpha rendering, or the like. In general, one or more of the rendering passes may be performed. As discussed with respect to game client-independent rendering, more rendering passes may improve the game element rendering but may require more server system resources. In some examples, the server system may determine whether to perform a type of rendering pass based on one or more factors such as a server resource load, a location or prominence of the game element, a number of uses of the game client-independent rendering, or a game element importance, or the like.

As will be appreciated, in general, the technique discussed with respect to blocks 240, 245 of method 200 may provide a game element rendering for a game client. In general, any technique or techniques may be used to provide the game client rendering of the game element. In some examples, a game client-independent rendering may not be performed and only a viewport dependent rendering may be performed.

Such techniques may offer simplicity of implementation and may provide the parallelization and resource allocation advantages as discussed herein. The process of method 200 may continue at block 250.

At block 250, "Transmit", the rendering of the game element or a portion of the game element may be transmitted to the game client. In general, the game element or the portion of the game element may be transmitted to the game client using any suitable communication technique or techniques. In some examples, the rendered game element or portion of the game element may be transmitted to the game client alone. In such examples, composition of the game scene may be completed by the game client. In some examples, a game client may require renderings of two or more game elements at their viewport. In some examples, the two or more game elements may be transmitted separately to the game client. In some examples, meta data related to recomposing the two or more game elements may be transmitted to the game client along with the renderings of the two or more game elements.

In some examples, the server may transmit a composited game scene or a portion of a composited game scene to the game client. In some examples, upon completion of a first game element rendering, the first game element may be saved at the game server until the two or more game elements may be rendered. In some examples, renderings of all the game element may be completed simultaneously or substantially simultaneously. Such techniques may provide parallel processing using, for example, map-reduce techniques as discussed herein. Upon completion of rendering of all the game elements in the game client's viewport, a game scene may be composited and transmitted to the game client. As discussed, in general, each game element may be rendered at a corresponding game element resource allocated to the game element. In some examples, the game scene composition may be performed at a game general game server resource of the server system. In some examples, the game scene composition may be performed at a game dedicated composition resource of the server system. The process of method 200 may continue at block 255.

At decision block 255, "Another Game Element?", it may be determined whether another game element may need to be evaluated at block 230. In general, it may be determined whether another game element may need to be evaluated in any suitable manner. In some examples, a list of game elements that may be in a game client's viewport may be maintained and a flag may be issued to each game element as it may complete the process related to blocks 220, 225, 230, 235, 240, 245, and/or 250. If another game element may need to be evaluated the process of method may continue at block 220. If another game element may not need to be evaluated the process may continue at decision block 260.

In some examples, if another game element may need to be evaluated, the process and techniques as discussed herein may be substantially repeated for the game element. In some examples, a first game element may be completed and upon return to block 220, the process may be performed on a second game element. In some examples, the process of the method 200 may determine whether a second game element may be viewable from the first viewport and, if the second game element may be viewable from the first viewport generating, at a game element resource corresponding to the second game element, a rendering of the second game element for the viewport and transmitting the rendering of the second game element to the game client.

In some examples, evaluation of other game elements may be performed simultaneously or substantially simultaneously with the first game element such that parallel processing techniques may be utilized. In general, method 200 may be performed simultaneously or substantially simultaneously for any number of game elements. In some examples, the parallel processing techniques may use a map-reduce architecture as discussed herein.

At decision block 260, "Another Game Client?", it may be determined whether another game client game client viewport may need to be evaluated at block 215. In general, it may be determined whether another game client may need to be evaluated using any suitable technique or techniques. In some examples, a list of game clients that may impacted by a received game input may be created and/or maintained and a flag may be issued to each game client as it may complete the process related to blocks 215, 220, 225, 230, 235, 240, 245, and/or 250. If another game client may need to be evaluated the process of method may continue at block 215. If another game element may not need to be evaluated the process may continue at block 210.

In some examples, if another game client may need to be evaluated, the process and techniques as discussed herein may be substantially repeated for the game client. In some examples, a first game client may be completed and upon return to block 225, and the process may be performed on a second game client. In some examples, the process of the method 200 may determine a second viewport of the game world view for a second game client. For the second game client, it may be determined whether a game element may be viewable from the second game client's viewport. As will be appreciated, in some examples, a game element previously rendered with respect to a first game client may also be in viewable from the second game client's viewport. In some examples, a game client-independent rendering performed with respect to the first game client may have been saved. In such examples, a game client-dependent rendering of the game element may be generated from the second game client viewport based on the second viewport and the previously performed and/or saved game client-independent rendering. Such techniques may save substantial processing resources at the server system.

In some examples, an evaluation for another game client may be performed simultaneously or substantially simultaneously with the first game element such that parallel processing techniques may be utilized. As discussed, in general, method 200 may be performed simultaneously or substantially simultaneously for any number of viewports. In some examples, the parallel processing techniques may use a map-reduce architecture as discussed herein. Such techniques may provide substantially efficient processing at a server system by reducing the amount of intra-system data movement required for a render task.

If another game client may not need to be evaluated or upon completion for all game clients, the process of method 200 may end at block 265 or continue at block 210 where the server system may await a requirement for a render task. In general, process of method 200 may be repeated any number of times as render tasks may be required.

As will be appreciated, the process of method 200 includes nested loops related to a loop for completing renderings for one or more game elements in a viewport nested within a loop for completing game views related to one or more game clients. Such nested loops may be completed for each determination of a needed render task. Such render task may define a needed rendering or frame rendering, or the like. In some examples, such nested loops may be leveraged to provide efficiencies at the server system. For example, a game element rendering loop may predict active game elements or polygons over time. In some examples, many poses of popular game elements may be saved or cached as game client-independent renderings such that those renderings may not need to be repeated again.

Further, the parallel architecture described with respect to FIG. 1 and elsewhere herein may be leveraged for efficiency at the server system. In general, the illustrated loops and/or nested loops of method 200 may be performed substantially in parallel at the servers system. For example, blocks 215, 220, 225, 230, 235, 240, 245, 250, 255, and/or 260 may be performed simultaneously or substantially simultaneously for any number of viewports and/or game clients using parallel processing techniques. In general, any serial description of method 200 may be implemented substantially using either a serial or parallel processing techniques.

Figure 3:
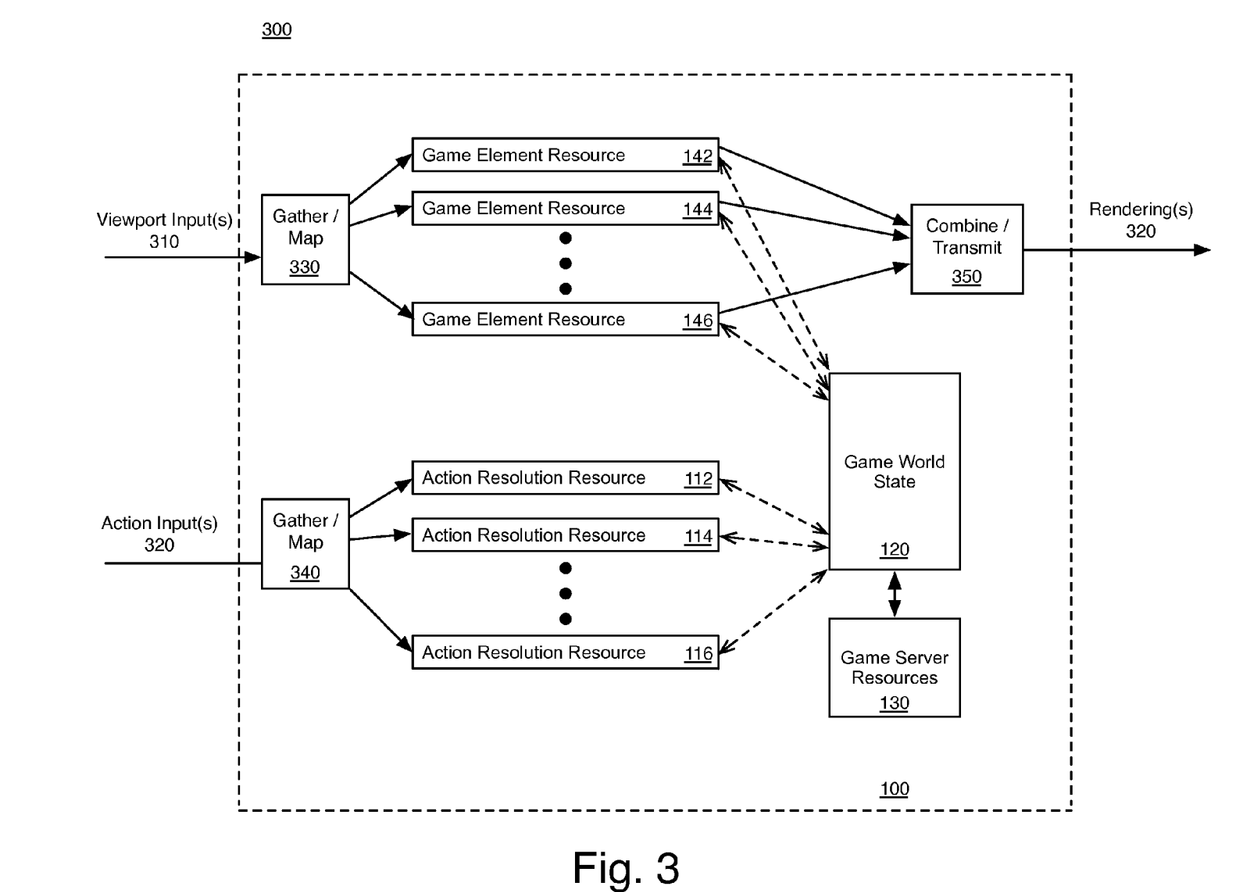
FIG. 3 is an illustration of a block diagram of an example implementation for providing an online gaming experience.

FIG. 3 is an illustration of a block diagram of an example implementation 300 for providing an online gaming experience, arranged in accordance with at least some embodiments of the present disclosure. As shown, implementation 300 may include system 100 that may include game element resources 142, 144, 146, action resolution resources 112, 114, 116, game server resources, and/or game world state 120 as discussed herein. In general, system 100 may be communicatively coupled to game clients (not shown for the sake of clarity) as discussed herein. As shown, implementation 300 may include receiving viewport input(s) 310 and/or action input(s) 320 at system 100. In general, viewport input(s) 310 and/or action input(s) 320 may be received from one or more of the game clients and may be any suitable inputs as discussed herein and, in particular, with respect to FIG. 1. In some examples, viewport input(s) 310 may include viewport information for one or more game clients and action input(s) 320 may include action information for one or more game clients.

As shown in FIG. 3, implementation 300 may include gather/map blocks 330, 340. In general, gather/map block 330 may gather and/or map information to game element resources 142, 144, 146 and gather/map block 340 may gather and/or map information to action resolution resources 112, 114, 116. In general, gather/map blocks 330, 340 may perform such gathering and/or mapping in response to any suitable request. In some examples, a request may be generated by game server resources 130, for example. In general, gather/map blocks 330, 340 may gather and map information using any suitable technique or techniques. In some examples, gather/map block 330 may gather information from game clients (not shown) including viewport input(s) 310 for mapping to game element resources 142, 144, 146. In some examples, gather/map block 340 may gather information from game clients (not shown) including action input(s) 320 for mapping to action resolution resources 112, 114, 116. In general, gather/map blocks 330, 340 may be implemented in any suitable manner at system 100. In some examples, gather/map blocks 330, 340 may be implemented as a part or portion of the game server resources of system 100. In some examples, gather/map blocks 330, 340 may be implemented as a computer, a multiple number of computers, a server, a computing resource, a virtual machine, or a computing cluster, or the like.

As shown in FIG. 3, implementation 300 may include combine/transmit block 350. In general, combine/transmit block 350 may combine and/or transmit information. In some examples, combine/transmit block 350 may combine information, such as game element renderings, for example, from game element resources 142, 144, 146 and transmit the information to game clients (not shown). In general, combine/transmit block 350 may perform such combining and/or transmitting in response to any suitable request. In some examples, a request may be generated by game server resources 130, for example. In general, combine/transmit block 350 may combine and/or transmit information using any suitable technique or techniques. In some examples, combine/transmit block 350 may gather game element renderings from game element resources 142, 144, 146. In some examples, combine/transmit block 350 transmit to game clients (not shown). As discussed herein, in some examples, the game element renderings may be transmitted as a composited scene and, in other embodiments, the game element renderings may be transmitted separately. In general, combine/transmit block 350 may be implemented in any suitable manner at system 100. In some examples, combine/transmit block 350 may be implemented as a part or portion of game server resources. In some examples, combine/transmit block 350 may be implemented as a computer, a multiple number of computers, a server, a computing resource, a virtual machine, or a computing cluster, or the like.

In general, gather/map blocks 340 and combine/transmit block 350 may provide parallel processing for action resolutions and game element renderings. In some examples, gather/map blocks 340 and combine/transmit block 350 may provide parallel processing using map reduce techniques. In some examples, gather/map blocks 340 and combine/transmit block 350 may provide parallel processing independently for action resolution and game element rendering such that they may not be on the same timing and/or demand schedule. In some examples, gather/map blocks 340 and combine/transmit block 350 may provide parallel processing for action resolution and game element rendering such that they may be on the same timing and/or demand schedule.

As discussed herein, action resolution resources 112, 114, 116 may each be allocated to game actions. Further, as discussed herein, such game actions may be performed using parallel processing techniques such as is shown in implementation 300. In some examples, an indication that an update to game world state 120 may be required, such as at a predetermined time, upon receiving one or more action input(s) 320, upon a determination a game change may be needed based on a game rule, a game algorithm, or game physics from the game being applied to the game world state, or the like, may be determined. In some examples, in response to the indication that an update to game world state 120 may be required, gather/map block 340 may gather a multiple number of gather action input(s) 320 and other information from game server resources 130 (if any) and map the inputs and/or other information to resolution resources 112, 114, 116. In some examples, resolution resources 112, 114, 116 may resolve the game actions based on the inputs and/or other information and provide updates to game world state 120. Such gather/map techniques and game world state updates may be made as needed.

As discussed herein, game element resources 142, 144, 146 may each be allocated to a game element. Further, as discussed herein, it may be determined at system 100 that a render task may be required. The determination that a render task may be required may be based on an update to game world state 120, for example. As discussed herein and, in particular with respect to FIG. 2, system 100 may determine whether game elements may be viewable, perform game client-independent renderings as needed, perform game client-dependent renderings as needed, and/or transmit completed game client-dependent renderings as needed. As discussed, such techniques may be performed using parallel processing such as is shown in implementation 300. In some examples, upon a determination that a render task is required, gather/map block 330 may gather a multiple number of viewport input(s) 310 either from the game clients (not shown) or from a determination made within system 100, or a combination thereof. The gathered viewport information and/or other information from may be mapped to game element resources 142, 144, 146. In some examples, game element resources 142, 144, 146 may provide game element renderings for one or more game clients as discussed herein. In some examples, the game client renderings, such as game client-dependent renderings may be combined at combine/transmit block 350. As discussed, the combined renderings may be transmitted to game clients (not shown) as a composited scene or as separate renderings. Such gather/map techniques and combine/transmit techniques may be repeated as needed. In some examples, they may be repeated each time a render task may be needed.

In general, the system architectures and methods described with respect to FIGS. 1, 2, and/or 3 may be implemented in any suitable server and/or computing system. Example systems are described with respect to FIG. 5 and elsewhere herein. In some examples, an online gaming system, data center, or data cluster, or other system as discussed herein may be implemented over multiple physical sites or locations. In some examples, an online gaming system may be configured to provide an online gaming experience for multiple games.

FIG. 4 illustrates an example computer program product 400, arranged in accordance with at least some embodiments of the present disclosure. Computer program product 400 may include machine readable non-transitory medium having stored therein a plurality of instructions that, when executed, cause the machine to provide an online gaming experience according to the processes and methods discussed herein. Computer program product 400 may include a signal bearing medium 402. Signal bearing medium 402 may include one or more machine-readable instructions 404, which, when executed by one or more processors, may operatively enable a computing device to provide the functionality described herein. In various examples, some or all of the machine-readable instructions may be used by the devices discussed herein.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communication link, a wireless communication link, etc.). In some examples, signal bearing medium 402 may encompass a machine readable non-transitory medium.

Figure 5:
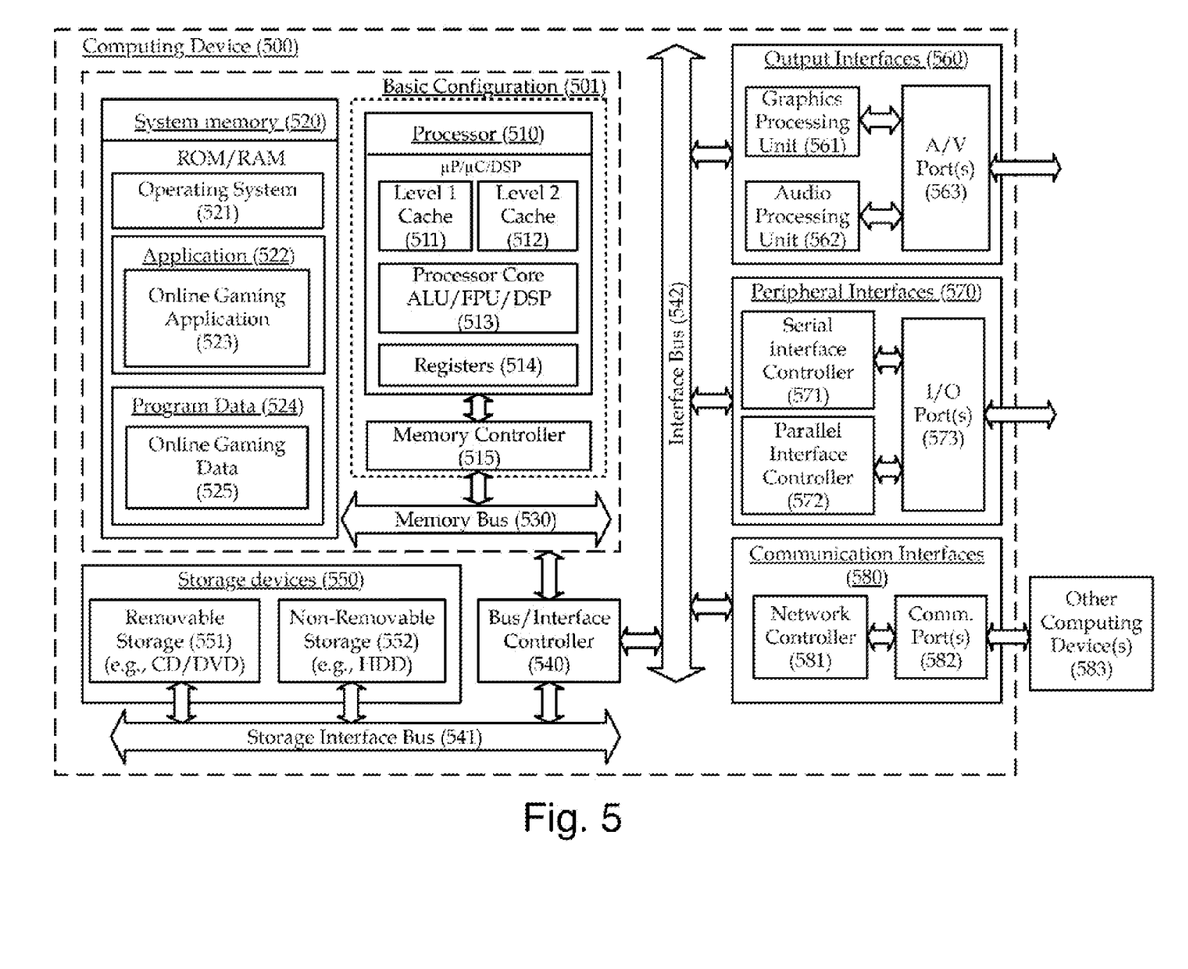
FIG. 5 is an illustration of a block diagram of an example computing device, all arranged in accordance with at least some embodiments of the present disclosure.

FIG. 5 is a block diagram illustrating an example computing device 500, arranged in accordance with at least some embodiments of the present disclosure. In various examples, computing device 500 may be configured to provide an online gaming experience as discussed herein. In various examples, computing device 500 may be configured to provide an online gaming experience as a server system as discussed herein. In one example basic configuration 501, computing device 500 may include one or more processors 510 and system memory 520. A memory bus 530 can be used for communicating between the processor 510 and the system memory 520.

Depending on the desired configuration, processor 510 may be of any type including but not limited to a microprocessor (μP), a microcontroller (μC), a digital signal processor (DSP), or any combination thereof. Processor 510 can include one or more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 may be of any type including but not limited to volatile memory (such as RAM), nonvolatile memory (such as ROM, flash memory, etc.) or any combination thereof. System memory 520 may include an operating system 521, one or more applications 522, and program data 524. Application 522 may include online gaming application 523 that can be arranged to perform the functions, actions, and/or operations as described herein including the functional blocks, actions, and/or operations described herein. Program Data 524 may include online gaming data 525 for use with online gaming application 523. In some example embodiments, application 522 may be arranged to operate with program data 524 on an operating system 521. This described basic configuration is illustrated in FIG. 5 by those components within dashed line 501.

Computing device 500 may have additional features or functionality, and additional interfaces to facilitate communications between the basic configuration 501 and any required devices and interfaces. For example, a bus/interface controller 540 may be used to facilitate communications between the basic configuration 501 and one or more data storage devices 550 via a storage interface bus 541. The data storage devices 550 may be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 542 for facilitating communication from various interface devices (e.g., output interfaces, peripheral interfaces, and communication interfaces) to the basic configuration 501 via the bus/interface controller 540. Example output interfaces 560 may include a graphics processing unit 561 and an audio processing unit 562, which may be configured to communicate to various external devices such as a display or speakers via one or more A/V ports 563. Example peripheral interfaces 570 may include a serial interface controller 571 or a parallel interface controller 572, which may be configured to communicate with external devices such as input devices (e.g., keyboard, mouse, pen, voice input device, touch input device, etc.) or other peripheral devices (e.g., printer, scanner, etc.) via one or more I/O ports 573. An example communication interface 580 includes a network controller 581, which may be arranged to facilitate communications with one or more other computing devices 583 over a network communication via one or more communication ports 582. A communication connection is one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 500 may be implemented as a portion of a small-form factor portable (or mobile) electronic device such as a cell phone, a mobile phone, a tablet device, a laptop computer, a personal data assistant (PDA), a personal media player device, a wireless web-watch device, a personal headset device, an application specific device, or a hybrid device that includes any of the above functions. Computing device 500 may also be implemented as a personal computer including both laptop computer and non-laptop computer configurations. In addition, computing device 500 may be implemented as part of a wireless base station or other wireless system or device.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter.

Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

What is claimed:

1. A computer-implemented method to allocate rendering tasks to resources of a server system, the method comprising:
    determining, by the server system, at least a portion of a first game world view viewable at a first game client of a plurality of game clients, wherein the at least the portion of the first game world view includes a first game element and a second game element, and wherein the first game world view is representative of a first game world state;
    receiving, by the server system, at least a portion of a game input from the first game client;
    determining based on the at least the portion of the game input, by the server system, a change from the first game world state to a second game world state;
    determining based on the second game world state, by the server system, a second game world view, wherein at least a portion of the second game world view is viewable at the first game client;
    determining, by the server system in consequence of the receiving the at least the portion of the game input from the first game client, a first render task to update rendering of the first game element and a second render task to update rendering of the second game element;
    allocating, by the server system, the first render task to a first game element resource and the second render task to a second game element resource;
    receiving, by the server system, an updated rendering of the first game element from the first game element resource and an updated rendering of the second game element from the second game element resource; and
    transmitting, by the server system, the second game world view to the first game client for display;
    wherein the at least the portion of the second game world view includes the updated rendering of the first game element and the updated rendering of the second game element.

2. The computer-implemented method of claim 1 wherein the first game element resource is configured to transmit the updated rendering of the first game element to the first client, and wherein the second game element resource is configured to transmit the updated rendering of the second game element to the first client.

3. The computer-implemented method of claim 1, wherein the server system is an online gaming system, a data center, or a data cluster.

4. The computer-implemented method of claim 1, wherein the first game element resource is a computer, a multiple number of computers, a server, a computing resource, a virtual machine, or a computing cluster.

5. The computer-implemented method of claim 1, wherein the first game element is at least a portion of a game character, a game object or a game scene.

6. A machine readable non-transitory medium having stored therein instructions that, when executed, cause a server system to allocate rendering tasks to resources of a server system by performing operations comprising:

determining, by the server system, at least a portion of a first game world view viewable at a first game client of a plurality of game clients, wherein the at least the portion of the first game world view includes a first game element and a second game element, and wherein the first game world view is representative of a first game world state;

receiving, by the server system, at least a portion of a game input from the first game client;

determining based on the at least the portion of the game input, by the server system, a change from the first game world state to a second game world state;

determining based on the second game world state, by the server system, a second game world view, wherein at least a portion of the second game world view is viewable at the first game client;

determining, by the server system in consequence of the receiving the at least the portion of the game input from the first game client, a first render task to update rendering of the first game element and a second render task to update rendering of the second game element;

allocating, by the server system, the first render task to a first game element resource and the second render task to a second game element resource;

receiving, by the server system, an updated rendering of the first game element from the first game element resource and an updated rendering of the second game element from the second game element resource; and transmitting, by the server system, the second game world view to the first game client for display;

wherein the at least the portion of the second game world view includes the updated rendering of the first game element and the updated rendering of the second game element.

7. The machine readable non-transitory medium of claim 6, wherein the first game element resource is configured to transmit the updated rendering of the first game element to the first client, and wherein the second game element resource is configured to transmit the updated rendering of the second game element to the first client.

8. The machine readable non-transitory medium of claim 6, wherein the server system is an online gaming system, a data center, or a data cluster.

9. The machine readable non-transitory medium of claim 6, wherein the first game element resource is a computer, a multiple number of computers, a server, a computing resource, a virtual machine, or a computing cluster.

10. The machine readable non-transitory medium of claim 6, wherein the first game element is at least a portion of a game character, a game object or a game scene.

11. A server system comprising:
a machine readable medium having stored therein instructions that, when executed, cause the server system to allocate rendering tasks to resources of a server system by performing operations comprising:

determining, by the server system, at least a portion of a first game world view viewable at a first game client of a plurality of game clients, wherein the at least the portion of the first game world view includes a first game element and a second game element, and wherein the first game world view is representative of a first game world state;

receiving, by the server system, at least a portion of a game input from the first game client;

determining based on the at least the portion of the game input, by the server system, a change from the first game world state to a second game world state;

determining based on the second game world state, by the server system, a second game world view, wherein at least a portion of the second game world view is viewable at the first game client;

determining, by the server system in consequence of the receiving the at least the portion of the game input from the first game client, a first render task to update rendering of the first game element and a second render task to update rendering of the second game element;

allocating by the server system, the first render task to a first game element resource and the second render task to a second game element resource receiving, by the server system, an updated rendering of the first game element from the first game element resource and an updated rendering of the second game element from the second game element resource; and transmitting, by the server system, the second game world view to the first game client for display;

wherein the at least the portion of the second game world view includes the updated rendering of the first game element and the updated rendering of the second game element.

12. The server system of claim 11, wherein the first game element resource is configured to transmit the updated rendering of the first game element to the first client, and wherein the second game element resource is configured to transmit the updated rendering of the second game element to the first client.

13. The server system of claim 11, wherein the server system is an online gaming system, a data center, or a data cluster.

14. The server system of claim 11, wherein the first game element resource is a computer, a multiple number of computers, a server, a computing resource, a virtual machine, or a computing cluster.

15. The server system of claim 11, wherein the first game element is at least a portion of a game character, a game object or a game scene.

* * * * *